(12) United States Patent
Beachum, III et al.

(10) Patent No.: US 7,788,149 B2
(45) Date of Patent: Aug. 31, 2010

(54) METHOD AND COMPUTER PROGRAM FOR THE ACQUISITION OF CAPITAL EQUIPMENT USING WEB-BASED PURCHASE POOLING

(75) Inventors: Graham C. Beachum, III, Dallas, TX (US); Graham C. Beachum, II, Dallas, TX (US); Scott Chidester, Corinth, TX (US)

(73) Assignee: Demand Aggregation Solution LLC, Dallas, TX (US)

(*) Notice: Subject to any disclaimer, the term of this patent is extended or adjusted under 35 U.S.C. 154(b) by 775 days.

(21) Appl. No.: 11/478,917

(22) Filed: Jun. 30, 2006

(65) Prior Publication Data

US 2008/0004976 A1 Jan. 3, 2008

(51) Int. Cl.
*G06Q 40/00* (2006.01)
(52) U.S. Cl. ............... 705/35; 705/36 R; 705/37; 705/26
(58) Field of Classification Search ........... 705/35–37, 705/26
See application file for complete search history.

(56) References Cited

U.S. PATENT DOCUMENTS

| | | | |
|---|---|---|---|
| 5,794,219 A | 8/1998 | Brown | |
| 6,052,669 A * | 4/2000 | Smith et al. | 705/26 |
| 6,260,024 B1 | 7/2001 | Shkedy | |
| 6,604,089 B1 * | 8/2003 | Van Horn et al. | 705/26 |
| 6,631,356 B1 * | 10/2003 | Van Horn et al. | 705/26 |
| 6,876,983 B1 * | 4/2005 | Goddard | 705/37 |
| 6,934,690 B1 | 8/2005 | Van Horn et al. | |
| 7,110,976 B2 * | 9/2006 | Heimermann et al. | 705/37 |
| 7,346,561 B1 * | 3/2008 | Devitt et al. | 705/27 |
| 7,349,879 B2 * | 3/2008 | Alsberg et al. | 705/37 |
| 7,433,841 B2 * | 10/2008 | Byde et al. | 705/37 |
| 7,467,103 B1 * | 12/2008 | Murray et al. | 705/26 |

(Continued)

FOREIGN PATENT DOCUMENTS

WO    WO 01/29729 A2    4/2001

OTHER PUBLICATIONS

Sadock Jonathan "Capital Equipment Acquisition: Coping with Present and planning for the Future" Hospital Material Management Quarterly, Nov. 1990, pp. 37-40.*

(Continued)

*Primary Examiner*—Narayanswamy Subramanian
(74) *Attorney, Agent, or Firm*—Gardere Wynne Sewell LLP; Karl L. Larson

(57) ABSTRACT

A method and system for the acquisition of capital equipment using web-based purchase pooling including storing a default specification for capital equipment in a database, assigning a plurality of potential buyers to a purchasing pool, providing access to the default specification via a web-based system in communication with the database to the plurality of potential buyers using client devices over a network, receiving by the web-based system a plurality of customized specifications based on the default specification from one or more of the plurality of potential buyers via the client devices, determining by the web-based system common portions and non-common portions of the plurality of customized specifications based on a comparison of the plurality of customized specifications, selecting at least one of the non-common portions, and providing a request for proposal, which includes the common portions and the selected non-common portions, to at least one potential seller of capital equipment.

33 Claims, 20 Drawing Sheets

U.S. PATENT DOCUMENTS

| | | | |
|---|---|---|---|
| 2001/0032162 A1* | 10/2001 | Alsberg et al. | 705/37 |
| 2002/0069079 A1* | 6/2002 | Vega | 705/1 |
| 2002/0103746 A1* | 8/2002 | Moffett, Jr. | 705/37 |
| 2002/0107761 A1* | 8/2002 | Kark et al. | 705/27 |
| 2003/0028451 A1* | 2/2003 | Ananian | 705/27 |
| 2003/0041008 A1* | 2/2003 | Grey et al. | 705/37 |
| 2003/0041013 A1* | 2/2003 | Grey et al. | 705/37 |
| 2003/0055779 A1 | 3/2003 | Wolf | |
| 2003/0069824 A1* | 4/2003 | Menninger | 705/37 |
| 2004/0030611 A1* | 2/2004 | Byrne | 705/26 |
| 2004/0148228 A1* | 7/2004 | Kwei | 705/26 |
| 2004/0220873 A1* | 11/2004 | Nolan et al. | 705/38 |
| 2004/0220874 A1* | 11/2004 | Singh et al. | 705/38 |
| 2004/0225584 A1* | 11/2004 | Quinn et al. | 705/35 |
| 2005/0060235 A2* | 3/2005 | Byrne | 705/26 |
| 2005/0177453 A1* | 8/2005 | Anton et al. | 705/26 |
| 2007/0250330 A1* | 10/2007 | Chen et al. | 705/1 |

OTHER PUBLICATIONS

Pols Luc A "Negotiating Optimum Capital Equipment Acquisitions" Healthcare Financial Management, Jun. 1999, pp. 66-67.*

* cited by examiner

| | | | | | |
|---|---|---|---|---|---|
| PurchasePooling Solutions | | | | | |
| | The Premier Marketplace for Public Sector Savings. | | | | |
| Pool Information | Services Overview | Register | News and Events | About | Contact Us |

"User KLARSON logged in."

- Instructions
- Schedule & Bus Profile
- Pool Contacts
- Invite Other Agencies
- Document Library
- Discussion Board My Specification
- Download SBPG
- Requirements
- Addendums
- Print Preview Spec Collaboration
- Aggregate Matrix
- My Spec vs. Pool Spec
- Vendor Price Comparison
- Agency Specification Comparison

△△△△△ LOGOUT

My Pools

Create a Pool

Search Active Pools

My Profile

Schedule and Bus Profile

RTC - 40LFCNG - 03/23/2006 - ID160 - ACTIVE

POOL DESCRIPTION

Regional Transportation Commission of Southern Nevada
(40' LFCNG Bus Pool)

Lead Agency Name: Regional Transportation Commission
Pool Management/Lead Agency Contact: Lydia Bilynsky - (1504)
Commodity Expert: Regional Transportation Commission
Vehicle Type: LOWFLOOR-CNG
Vehicle Dimensions: Length: 40 Width: 102
Pool Open: 05/01/2006
Prebid Conference: 06/06/2006
Publish RFP: 06/11/2006
Approved Equals Request Due: 06/20/2006
Award: 07/21/2006

©2002-2005 PurchasePooling Solutions, All Rights Reserved.

| PurchasePooling Solutions | Services Overview | Register | News and Events | About | Contact Us |

The Premier Marketplace for Public Sector Savings.

"User KLARSON logged in."

- Instructions
- Schedule & Bus Profile
- Pool Contacts
- Invite Other Agencies
- Document Library
- Discussion Board My Specification
- Download SBPG
- Requirements
- Addendums
- Print Preview Spec Collaboration
- Aggregate Matrix
- My Spec vs. Pool Spec
- Vendor Price Comparison
- Agency Specification Comparison

△△△△△ LOGOUT

Invite Other Agencies

| 1. Select Agencies | 2. Write Email | 3. Preview & Confirm | 4. Email Sent |

Instructions
The Process to invite other agencies to participate in a pool is a 4 step process:
1. Select the agencies you want to send the invite email to by checking their corresponding checkbox below or enter comma separated emails below.
2. Create the invitation email using the default text provided. (You can also customize this email to your needs)
3. Preview the email to confirm to audience and message is correct before sending.
4. Verification that the email message was sent to the selected agencies.

Emails: [            ] (ex: bob@msn.com, ted@msn.com)

| Agency | Email Address | Location |
|---|---|---|
| ☐ Alexandria Transit Company | sandy.modell@ci.alexandria.va.us | VA, Alexandria |
| ☐ Altoona Metro Transit | eric.wolf@amtran.org | PA, Altoona |
| ☐ American Public Transportation Association | pboswell@apta.com | DC, Washington |
| ☐ Ames Transit Agency | bbourne@cyride.com | IA, Ames |
| ☐ Ann Arbor Transportation Authority | gcook@theride.org | MI, Ann Arbor |

My Pools

Create a Pool

Search Active Pools

My Profile

PurchasePooling Solutions — The Premier Marketplace for Public Sector Savings.

| Pool Information | Services Overview | Register | News and Events | About | Contact Us |

"User KLARSON logged in."

- My Pools
- Create a Pool
- Search Active Pools
- My Profile

Select Requirements

Choose a section below to detail your baseline or alternative requirements to the SBPG.

REQUIREMENTS MENU

Request for Proposal Offer & Award (Section 1)
   Request for Proposal Offer & Award General Contractual Provisions (Section 2)
   General Contractual Provisions Quality Assurance Provisions (Section 3)
   Quality Assurance Provisions Warranty Provisions (Section 4)
   Warranty Provisions Technical Requirements (Section 5)
   Propulsion & Chassis
   Structures, Panels & Finishes
   Passenger Accommodations
   Operator Provisions
   Windows
   HVAC
   Passenger Stop Request & Electrical
   Information Level Components

- Instructions
- Schedule & Bus Profile
- Pool Contacts
- Invite Other Agencies
- Document Library
- Discussion Board

My Specification
- Download SBPG
- Requirements
- Addendums
- Print Preview

Spec Collaboration
- Aggregate Matrix
- My Spec vs. Pool Spec
- Vendor Price Comparison
- Agency Specification Comparison

LOGOUT

160

| http://staging.transitpool.com - Pop Section Read Only - ... | | | |
|---|---|---|---|
| 1.1.1.1 RTC AND CONTRACTING OFFICER | | | |
| Request For Proposals | XX-XXXXX | | |
| | Proposals delivered in person or by a means other than the U.S. Postal Service shall be submitted to the following:<br><br>Regional Transportation Commission of Southern Nevada<br><br>600 S. Grand Central Pkwy.<br>Suite 350<br>Las Vegas, Nevada 89106-4512<br>Attention: Lydia Bilynsky | | |
| Telephone | (702)676-1528 | Fax No: | (702)676-1588 |
| E-MAIL | bilynskyl@rtcsnv.com | | |

Cancel

PurchasePooling Solutions — The Premier Marketplace for Public Sector Savings.

| Pool Information | Services Overview | Register | News and Events | About | Contact Us |

"User KLARSON logged in."

- My Pools
- Create a Pool
- Search Active Pools
- My Profile

- Instructions
- Schedule & Bus Profile
- Pool Contacts
- Invite Other Agencies
- Document Library
- Discussion Board My Specification Spec Print Preview The link below will launch a new browser with the complete RFP Document. The document is very large and will take a couple minutes to load. Please be patient and only click the link 1 time.

View RFP Document

©2002–2005 PurchasePooling Solutions, All Rights Reserved.

- Download SBPG
- Requirements
- Addendums
- Print Preview

Spec Collaboration

- Aggregate Matrix
- My Spec vs. Pool Spec
- Vendor Price Comparison
- Agency Specification Comparison

LOGOUT

1.1 REQUEST FOR PROPOSALS

1.1.1 SOLICITATION DATA

1.1.1.1 RTC AND CONTRACTING OFFICER

| Request For Proposals | XX-XXXXX | |
|---|---|---|
| Proposals delivered in person or by a means other than the U.S. Postal Service shall be submitted to the following: | | |
| Regional Transportation Commission of Southern Nevada<br>600 S. Grand Central Pkwy.<br>Suite 350<br>Las Vegas, Nevada 89106-4512<br>Attention: Lydia Bilynsky | | |
| Telephone | (702)676-1528 | Fax No: | (702)676-1588 |
| E-MAIL | bilynskyl@rtcsnv.com | | |

1.1.1.2 SCOPE

The Regional Transportation Commission of Southern Nevada (RTC) in partnership with the City of Phoenix, Arizona (CoP); and Orange County Transportation Authority (OCTA), requests proposals for the manufacture and delivery of natural gas transit buses and spare parts in accordance with the terms and conditions set forth below. The Contract shall be a firm-fixed price Contract. The proposals are requested for up to 12345 each, 40' low-floor Compressed Natural Gas (CNG) buses for RTC and OCTA, and 12345 each, 40' low-floor Liquefied Natural Gas (LNG) buses for CoP, if all options are exercised. Pricing is reflective of multi-year deliveries to include, 123 CNG units and 123 LNG units on the initial order to be delivered in the year 2007, with option one (1), for one hundred fifty (150) CNG units and 123 LNG units to be delivered in the year 2008. The option will require RTC & Partners Board approval.

The RTC & Partners reserve the right to award its total requirements to one Offeror, or to apportion those requirements among more than one Offeror, as the RTC and partnership Agencies may deem to be in their best interests.

1.1.1.3 SOLICITATION SCHEDULE

*FIG. 13*

TEXT REVISIONS:

5.2.2.1.1  Engine

The engine control system shall have onboard diagnostic capabilities able to monitor vital engine functions, store and time stamp out of parameter conditions in memory, and communicate faults and vital conditions to service personnel. Diagnostic reader device connector ports, suitably protected against dirt and moisture, shall be provided in operators area and near or inside engine compartment. Optional requirements for additional ports are identified in Section 5.5.6. The onboard diagnostic system shall inform the operator via visual and/or audible alarms when out of parameter conditions exist for vital engine functions. Conditions that require an operator alarm are identified in Section 5.4.6.1.6. Data communication requirements for the on-board Drivetrain diagnostic system are identified in Section 5.5.5.2.2.

(SEE SECTION 5.6 WMATA ATTACHMENTS TO PART 5: Technical Specifications)

● Procuring Agency's Modification

The HHDG engine shall be designed to operate for not less than 300,000 miles without major failure or significant deterioration. Components of the fuel management and/or control system shall be designed to operate for not less than 150,000 miles without replacement or major service. Exception: Spark plugs and wires, spark coil, oxygen sensor. Mileage intervals are based on the design operating profile defined in Section 5.1.2.

The engine shall meet all requirements of Part 5: Technical Specifications when operating on fuel equal to CARB Specifications for Compressed Natural Gas #2292.5. The four predominant characteristics that must be met are Methane, Ethane, Butane, and Propane.

The engine shall be equipped with an electronically controlled

○ Original SBPG Text

[SUBMIT]  [DELETE]  [APPROVED EQUALS REQUEST]

Transit Pool - Aggregate Matrix - Microsoft Internet Explorer

PurchasePooling Solutions,Inc. | Aggregation Matrix

| HEADERS OFF | PG | X | SCHID | POOL |
|---|---|---|---|---|
| Number of Units | 60 | 1 | 1 | 62 |
| 5.1 GENERAL | | | | |
| 5.1.5.1 DIMENSIONS | | | | |
| 5.1.5.1.1 PHYSICAL SIZE | | | | |
| 5.1.5.1.1.a Bus Length | | B1 | B1 | B1 |
| 5.1.5.1.1.b Bus Width | | B1 | NP | NP |
| 5.1.5.4 SERVICE LIFE AND MAINTENANCE | | | | |
| 5.1.5.6 NOISE | | | | |
| 5.2 PROPULSION SYSTEM | | | | |
| 5.2.1 VEHICLE PERFORMANCE | | | | |
| 5.2.1.2.a Top Speed | | A3 | A0 | A3 |
| 5.2.1.2.b Governor | | A5 | A0 | A5 |
| 5.2.2 DRIVETRAIN | | | | |
| 5.2.2.1 POWER PLANT | | | | |
| 5.2.2.1.1 ENGINE | | | | |
| 5.2.2.1.1.a Fast Idle Device | | B1 | B1 | B1 |
| 5.2.2.1.1.b Auxiliary Heater | | B1 | B1 | B1 |
| 5.2.2.1.1.c Automatic Engine Protection/Shutdown Override Feature | | A1 | B1 | A1 |
| 5.2.2.1.2.1.a Coolant Filtration | | B1 | NP | NP |
| 5.2.2.1.2.1.b Cooling Fan | | A1 | B1 | A1 |
| 5.2.2.1.3 Transmission | | B1 | A1 | A1 |
| 5.2.2.1.4 Retarder | | B1 | A1 | A1 |
| 5.2.2.2.1 Service | | B1 | B1 | B1 |
| 5.2.2.2.3 Hydraulic Systems | | A1 | A1 | A1 |
| 5.2.2.3 FUEL SYSTEM | | | | |
| 5.2.2.3.1 Fuel Containers - Cylinders | | | | |

Vendor Price Comparison - Microsoft Internet Explorer

Vendor Price Comparison
Pool: HFDSL1503-202308a
Date/Time: 8/22/05 12:04 PM
Bus Type: 20' HIGHFLOOR-DSL
Number Buses: 100

| Specification | vendor1 | vendor2 |
|---|---|---|
| Base Bus Price | | |
| | $210,000.00 | $200,500.00 |
| 5.1 - GENERAL<br>5.1.5.1 - DIMENSIONS<br>5.1.5.1.1 - PHYSICAL SIZE | | |
| 5.1.5.1.1.a - BUS LENGTH | | |
| ✓ B1 - Use for 40ft length bus | $ 48,000.00 | $ 50,000.00 |
| A1 - Use for 35-ft length bus | $ 35,000.00 | $ 24,000.00 |
| C1 - | $ 0.00 | $ 0.00 |
| NP - | $ 0.00 | $ 0.00 |
| 5.1.5.1.1.b - BUS WIDTH | | |
| ✓ B1 - Use for 102 inch wide bus | $ 18,000.00 | $ 9,000.00 |
| C1 - | $ 0.00 | $ 0.00 |
| NP - | $ 0.00 | $ 0.00 |
| 5.1.5.4 - SERVICE LIFE AND MAINTENANCE | | |
| Retail Component Price Per Bus: | $ 68,200.00 | $ 59,200.00 |
| Retail Price Per Bus: | $ 278,200.00 | $ 259,700.00 |
| Pool Discount: | 3.00% | 5.00% |
| Pool Price Per Bus: | $ 269,854.00 | $ 246,715.00 |
| Pool Savings Per Bus: | $ 8,346.00 | $ 12,985.00 |
| Total Retail Price For 100 Buses: | $ 27,820,000.00 | $ 25,970,000.00 |
| Total Pool Price For 100 Buses: | $ 26,985,400.00 | $ 24,671,500.00 |
| Total Pool Savings For 100 Buses: | $ 834,600.00 | $ 1,298,500.00 |

[ Create & Save PDF Version in my Document Library ]

Agency Specification/Price Comparison

Pool: HFDSL1503-202308a
Bus Type: 20' HIGHFLOOR-DSL
Out of Pool Base Bus Price: $210,000.00
Vendor: vendor1

| Specification | schid | X |
|---|---|---|
| 5.1 - GENERAL | | |
| 5.1.5.1 - DIMENSIONS | | |
| 5.1.5.1.1 PHYSICAL SIZE | | |
| 5.1.5.1.1.a - BUS LENGTH | | |
| B1 - Use for 40ft length bus | ✓ $ 48,000.00 | ✓ $ 48,000.00 |
| A1 - Use for 35-ft length bus | $ 35,000.00 | $ 35,000.00 |
| C1 - | $ 0.00 | $ 0.00 |
| NP - | $ 0.00 | $ 0.00 |
| 5.1.5.1.1.b - BUS WIDTH | | |
| B1 - Use for 102 inch wide bus | ✓ $ 18,000.00 | ✓ $ 18,000.00 |
| C1 - | $ 0.00 | $ 0.00 |
| NP - | $ 0.00 | $ 0.00 |
| 5.1.5.4 - SERVICE LIFE AND MAINTENANCE | | |
| Retail Component Price Per Bus: | $ 68,200.00 | $ 66,200.00 |

[Create & Save PDF Version in my Document Library]

METHOD AND COMPUTER PROGRAM FOR THE ACQUISITION OF CAPITAL EQUIPMENT USING WEB-BASED PURCHASE POOLING

BACKGROUND OF THE INVENTION

1. Field of the Invention

The present invention relates to the acquisition of capital equipment and more particularly relates to a method and computer program for the acquisition of capital equipment using web-based purchase pooling.

2. Discussion of the Background

The Internet is considered the preferred marketplace for a variety of products including goods and services. Such products are commonly made available to users using client computers via one or more websites. Aggregate purchasing provides purchasers with leverage against sellers. The buying power of a group of people enables purchasers of the group to maneuver a seller to better terms than a single purchaser, thus providing considerable advantages to the purchasers of the group. For instance, the price point may be substantially lowered using aggregate purchasing.

Although web-based shopping has proliferated tremendously during the past few years, the collaborative acquisition of capital equipment has not been exploited. The purchase of capital equipment is complex and generally requires a detailed and complex request for proposal ("RFP") from the purchaser to describe the technical specifications of the capital equipment. One or more sellers respond to the RFP with a proposed bid after possibly an extended negotiation. This type of complex purchase is different than existing consumer-based methods known in the art. This is especially true in the area of governmental procurement of capital equipment.

Thus, there does not exist an effective way in the prior art to handle the acquisition of capital equipment.

SUMMARY OF THE INVENTION

Accordingly, one aspect of the present invention is to provide a method for the acquisition of capital equipment using web-based purchase pooling that includes storing a default specification for capital equipment in a database, assigning a plurality of potential buyers to a purchasing pool, providing access to the default specification via a web-based system in communication with the database to the plurality of potential buyers using client devices over a network, receiving by the web-based system a plurality of customized specifications based on the default specification from one or more of the plurality of potential buyers via the client devices, determining by the web-based system common portions and non-common portions of the plurality of customized specifications based on a comparison of the plurality of customized specifications, selecting at least one of the non-common portions, and providing a request for proposal to at least one potential seller of capital equipment. The default specification is associated with the purchasing pool. The plurality of customized specifications are stored in the database. The request for proposal includes the common portions and the selected non-common portions.

Another aspect of the present invention is to provide a computer program product for the acquisition of capital equipment using web-based purchase pooling. The computer program product includes a first computer code for storing a default specification for capital equipment in a database, a second computer code for assigning a plurality of potential buyers to a purchasing pool, a third computer code for providing access to the default specification via a web-based system in communication with the database to the plurality of potential buyers using client devices over a network, a fourth computer code for receiving by the web-based system a plurality of customized specifications based on the default specification from one or more of the plurality of potential buyers via the client devices, a fifth computer code for determining by the web-based system common portions and non-common portions of the plurality of customized specifications based on a comparison of the plurality of customized specifications, a sixth computer code for selecting at least one of the non-common portions, and a seventh computer code for providing a request for proposal to at least one potential seller of capital equipment. The default specification is associated with the purchasing pool. The plurality of customized specifications are stored in the database. The request for proposal includes the common portions and the selected non-common portions.

Yet another aspect of the present invention is to provide a system for the acquisition of capital equipment using web-based purchase pooling. The system includes a database configured to store a default specification for capital equipment, a plurality of client devices for use by potential purchasers of capital equipment, and a web-based system in communication with the database and the plurality of client devices. The web-based system is configured to provide access to the default specification via a web-based system to the plurality of potential buyers using their respective client devices, to receive a plurality of customized specifications based on the default specification from one or more of the plurality of potential buyers via their respective client devices, to enable each of the potential purchasers to use their respective client devices to create a customized specification based on the default specification, to determine common portions and non-common portions of the plurality of customized specifications based on a comparison of the plurality of customized specifications, and to provide a request for proposal to at least one potential seller of capital equipment, wherein the request for proposal comprises the common portions and at least one of the non-common portions.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 5-21 illustrate an exemplary web-based purchase pooling computer program according to the present invention.

DETAILED DESCRIPTION OF THE PREFERRED EMBODIMENTS

Figure 1:
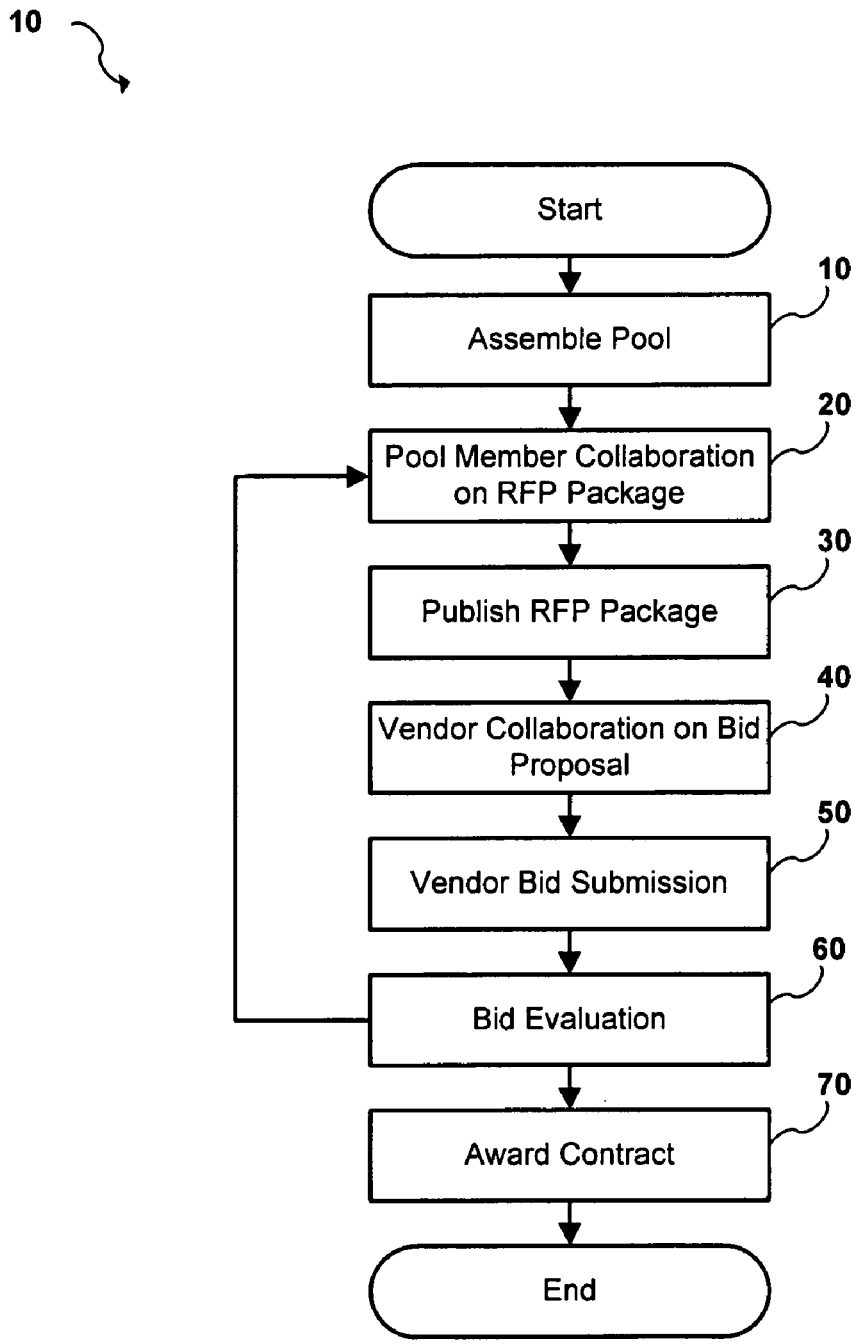
FIGS. 1-3 are flow charts illustrating the acquisition of capital equipment using web-based purchase pooling according to the present invention.

Referring now to the drawings, wherein like reference numerals designate identical or corresponding parts throughout the several views, preferred embodiments of the present invention are described.

The present invention utilizes a web-based software package that enables purchasers of capital equipment to make such purchases under more favorable terms and reduced cost. In one embodiment, the purchasers are procurement professionals, public sector entities or similar governmental agencies. The buying power of any one agency is combined with the purchasing needs of other agencies having similar needs. The web-based software manages the process of pooling multiple enterprises, such as transit agencies, for the acquisition or procurement of capital equipment.

The present invention normalizes specification requirements across all purchasers, increasing process efficiencies for manufacturers by reducing the costs related to responding to numerous procurements through the bids process. Manufacturers spend millions of dollars preparing bids for individual solicitations. The present invention enables manufacturers to submit a single bid for many purchasers. Manufacturers may combine purchasing requirements into orders to generate planning and production efficiencies, thereby, further reducing costs.

The present invention also adds value to manufacturers through greater access and visibility to established and new customers. Manufacturers currently rely on bid notifications from their distribution channel or from publication of advertisements in local newspapers. There are so many discrete purchasers purchasing small quantities of capital equipment that manufacturers may miss many opportunities to participate or even to bid. A web-based implementation allows manufacturers to have access to all purchasers. Utilizing economies of scale and pooling resources results in great value to both purchasers and the manufacturers.

The present invention utilizes a web-based application that manages and facilitates the process of pooling multiple users for the acquisition of capital equipment, such as transit buses. Users are provided with the opportunity to join collaborative purchasing pools to increase the value and effectiveness each user participating in the pool. In one embodiment, users are provided with access to preliminary surveys in which the timing and type of purchases may be specified by individual users and collectively viewed such that the overall timing and type of purchases of all users may be evaluated. Preliminary surveys may be manual or automated. Optionally, data associated with the prior purchasing history of individual users or purchase pools may be used instead of preliminary surveys or used to supplement the preliminary surveys. Preliminary surveys may be followed by requirements analysis surveys in which detailed technical requirements may be obtained and serve as the basis of core capital equipment configurations. During this process, pool members may collaborate with manufactures to provide feedback on their specifications and requirements. Collaborative communication is possible between the pool members and the manufacturer, including without limitation through email, bulletin board, discussion forum, instant messaging, telephonic and online conferencing communication. Based on the collective requirements, a core specification is created. Any customization requirements may be separated from the core specification. For instance, the customized requirements of each user may be separated onto a deviation or variation list. The pool member requirements are aggregated and an acceptable standard request for proposal ("RFP") package for the pool members overall is issued to manufacturers in accordance with the manufacturer's approval, notification, and other local terms, conditions and requirements. During the RFP process a pool member may optionally define weighting factors to be used for the evaluation criteria of whether to be included the RFP. The factors may be tied to individual specifications of the RFP package which if not satisfied will result in that pool member's non-participation in the RFP package or the automatic creation of variations or deviations based on the individual specifications.

The present invention facilitates and supports collaboration and discussions amongst pool members and manufacturers regarding:

Requests for clarifications, changes, approved equals, and permitted exceptions to the RFP;

Amendments to the RFP;

Providing software assistance to users in reviewing technical proposals for conformance with the specifications;

Facilitating communications with manufacturers to resolve questions, identify proposal deficiencies, and minimize any variations from the pooling concept;

Supporting the preparation of a request for best and final offers ("BAFO") for users to issue to manufacturers; and Providing software to be used by users in evaluating proposals, obtaining required approvals, and awarding contracts.

The present invention also provides technical assistance for explanations and recommendations regarding (i) the pooled procurement process, (ii) the core specification, pool specification, and deviations or variations, and (iii) responsibility determination, including methods criteria and process checklist, of prospective award of a purchaser's contract.

The present invention aggregates technical specifications, local/regional laws, local requirements, pricing/cost matrices, and commercial terms and conditions, as well as many other requirements associated with capital equipment procurement. In one embodiment, multiple pool members, such as transit authorities, use the portal as a template to input their vehicle requirements. A pool may be created by a user specifying and/or describing the type of capital equipment that the user desires to procure. For instance, a governmental transit agency may select a type of vehicle, such as a "40 ft Low-Floor CNG Bus/30 ft High-Floor Diesel Bus." The web-based application provides a common interface for the gathering of each purchaser's unique and customized requirements. Once pool specifications are established, in one embodiment, the web-based application may be used to generate various matrices that allow for the comparison of each purchaser's requirements and specifications. The matrices may be generated by database queries and/or mathematical algorithms or the like. In another embodiment, the web-based application generates a collapsible XML structure that may be used for comparison of each purchaser's requirements and specifications. This comparison allows for the pool members to see their common needs versus other purchasers as well as the common needs of the purchasing pool as a whole. The application guides pool members through not only the creation of their online specification, but provides the framework for interactive collaboration as the purchasers evaluate the various matrices.

The web-based application delivers a common specification with options derived from multiple authorities entering individual specifications using the web-based interface. The preferences of each participating purchaser are recognized such that their unique requirements may be individually realized. A bid evaluation pricing matrix is provided to calculate multiple bus specifications and equipment configurations for price comparisons and the final cost.

In one embodiment, the functionality is divided into separate areas based on the "roles" the users have been assigned. Those roles include without limitation "admin users," "agency users" and "vendor users." Obviously, other users and/or roles and user names are possible within the scope of the present invention.

An admin user performs administrative tasks such as creating users, activating and closing pools and editing users. The admin user may also create a pool default specification to be used as a starting point for specifications during the procurement process. The admin user may optionally specify a list of users they would like to invite to the purchasing pool. The list of users to be invited to the purchasing pool may also be automatically selected based on historical information such as previous purchases and purchasing pool participation.

An agency user is a member of a pool. Agency users participate by entering their preferences using online specification forms, text revision entries, and custom entries. In one embodiment, one of the agency users is designated as the lead agency user and may have similar responsibilities as the admin users such as creation of a new pool, creating a default specification and designating users as members of the pool.

A vendor user is a limited access user and is generally not allowed access to the specification building process. The vendor user can join a purchasing pool to specify information used in bid evaluation and to create any approved equals. Optionally, an agency user may "what if" pricing based on the addition and/or removal of elective deviations the manufacturer has made available. The vendor approved equals are alternatives to the specification supplied by the pool members in the request for purchase.

Figure 2:
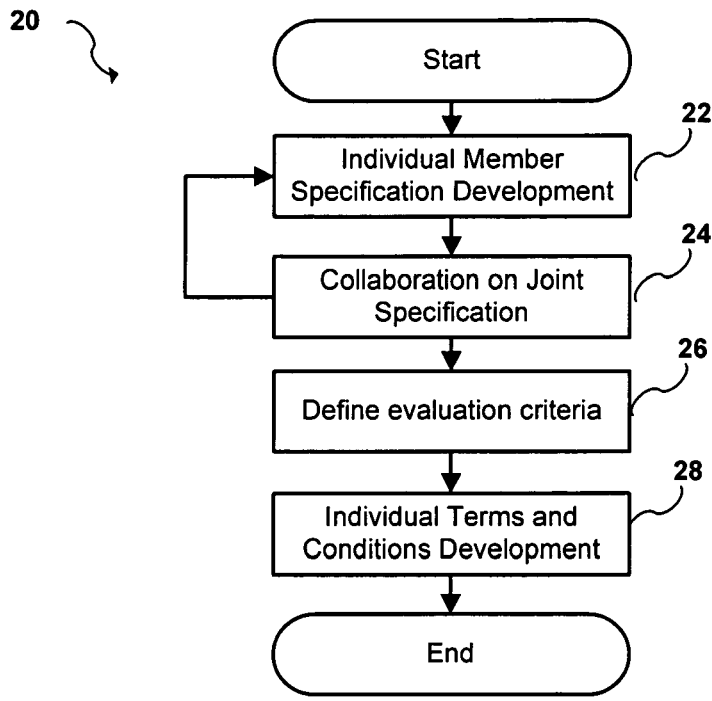
Figure 3:
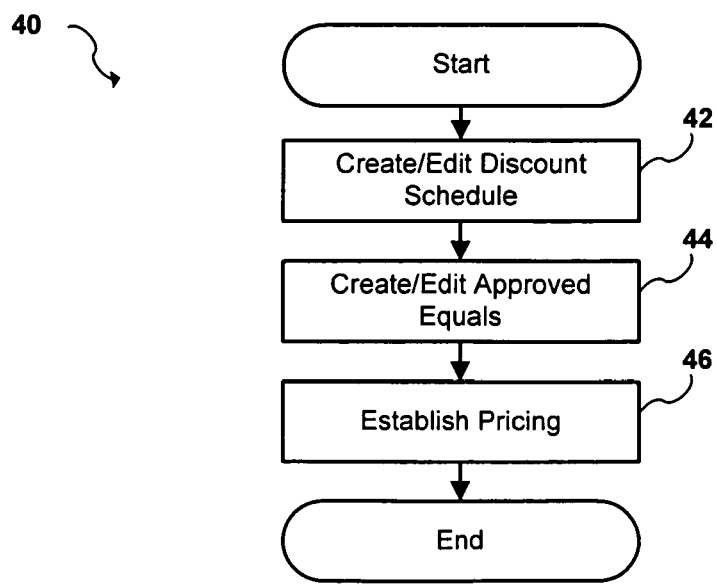
Figure 4:
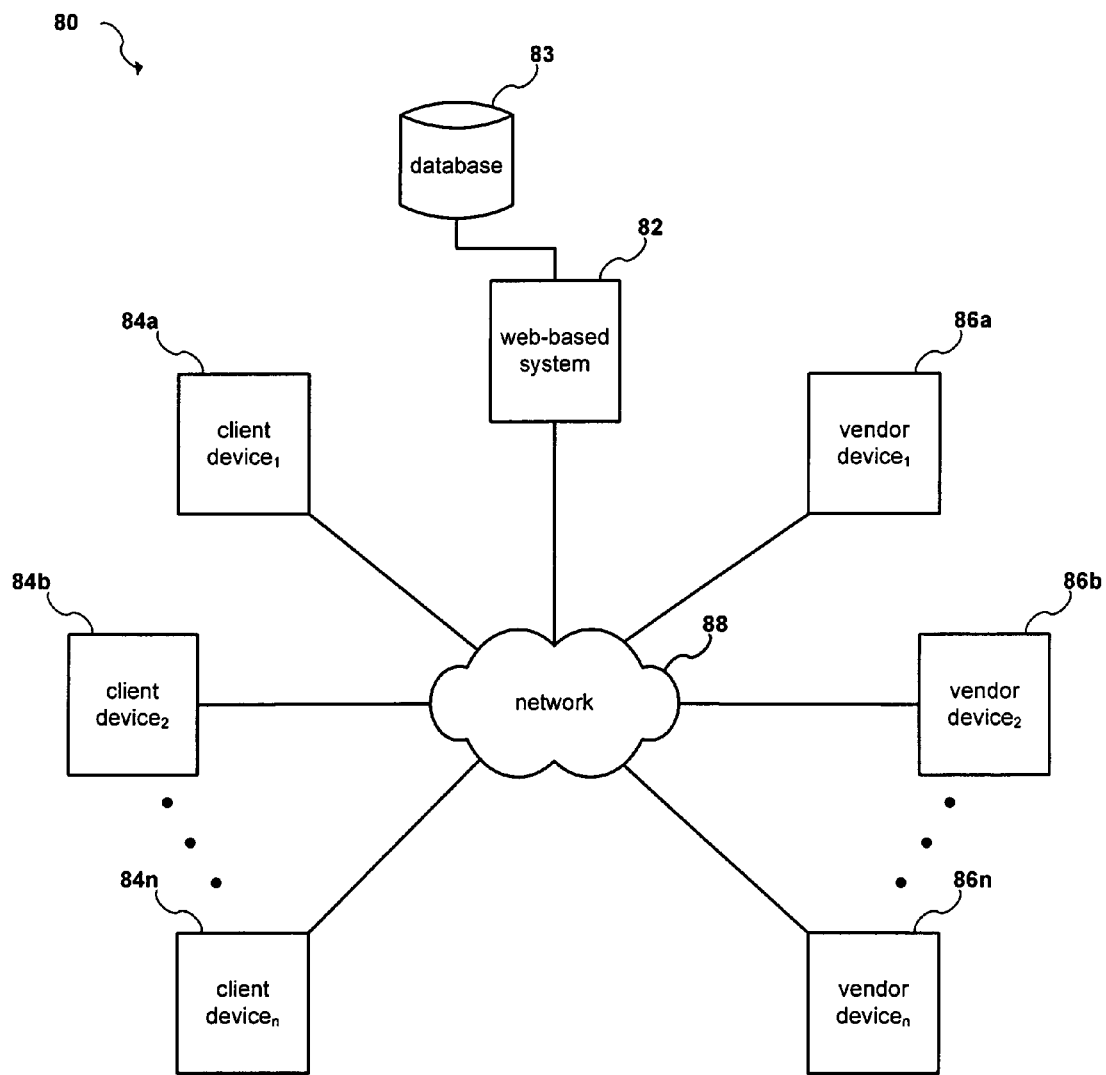
FIG. 4 is a block diagram illustrating web-based purchase pooling according to the present invention.
Figure 5:
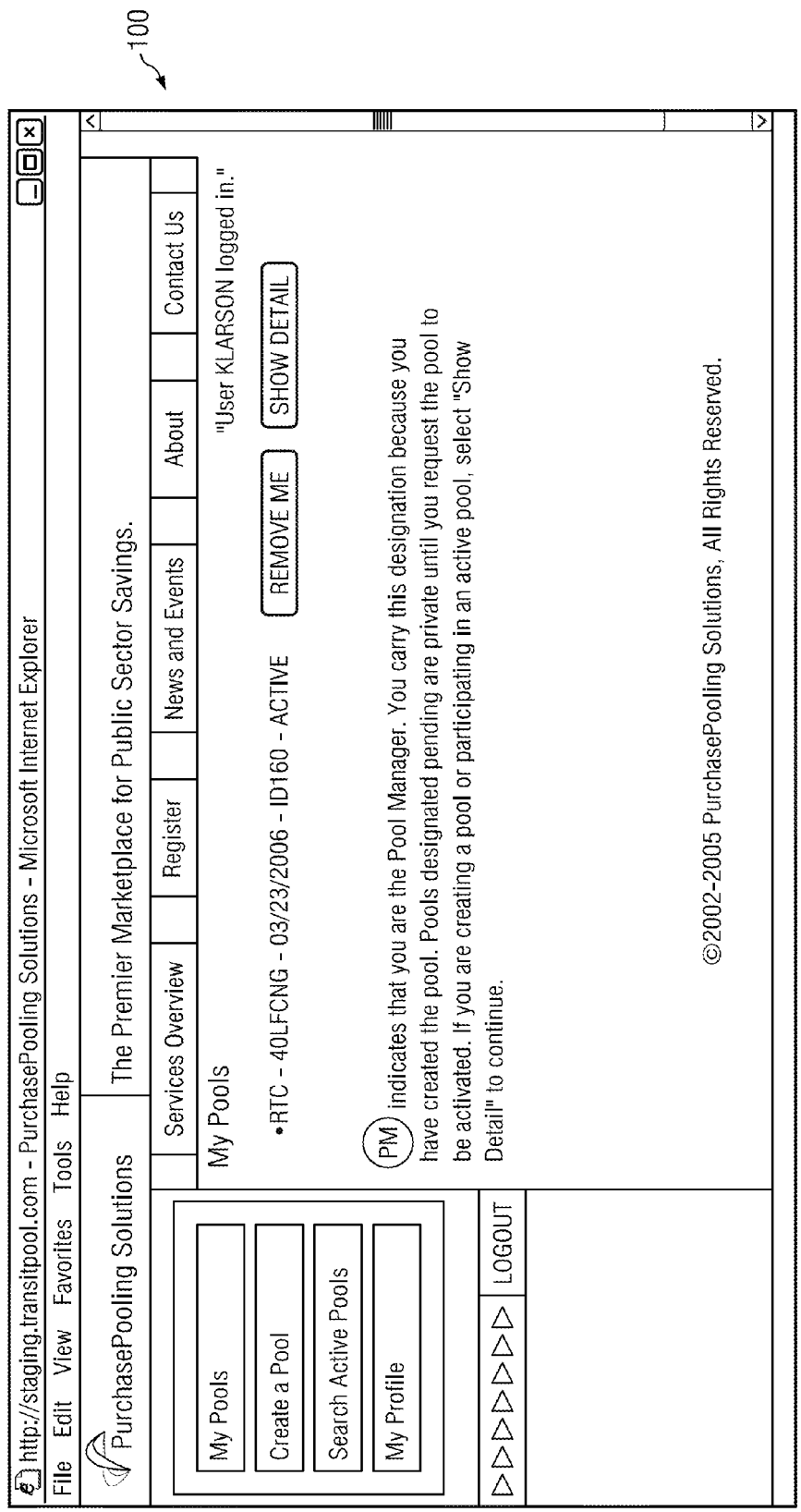
Figure 10:
Figure 14:
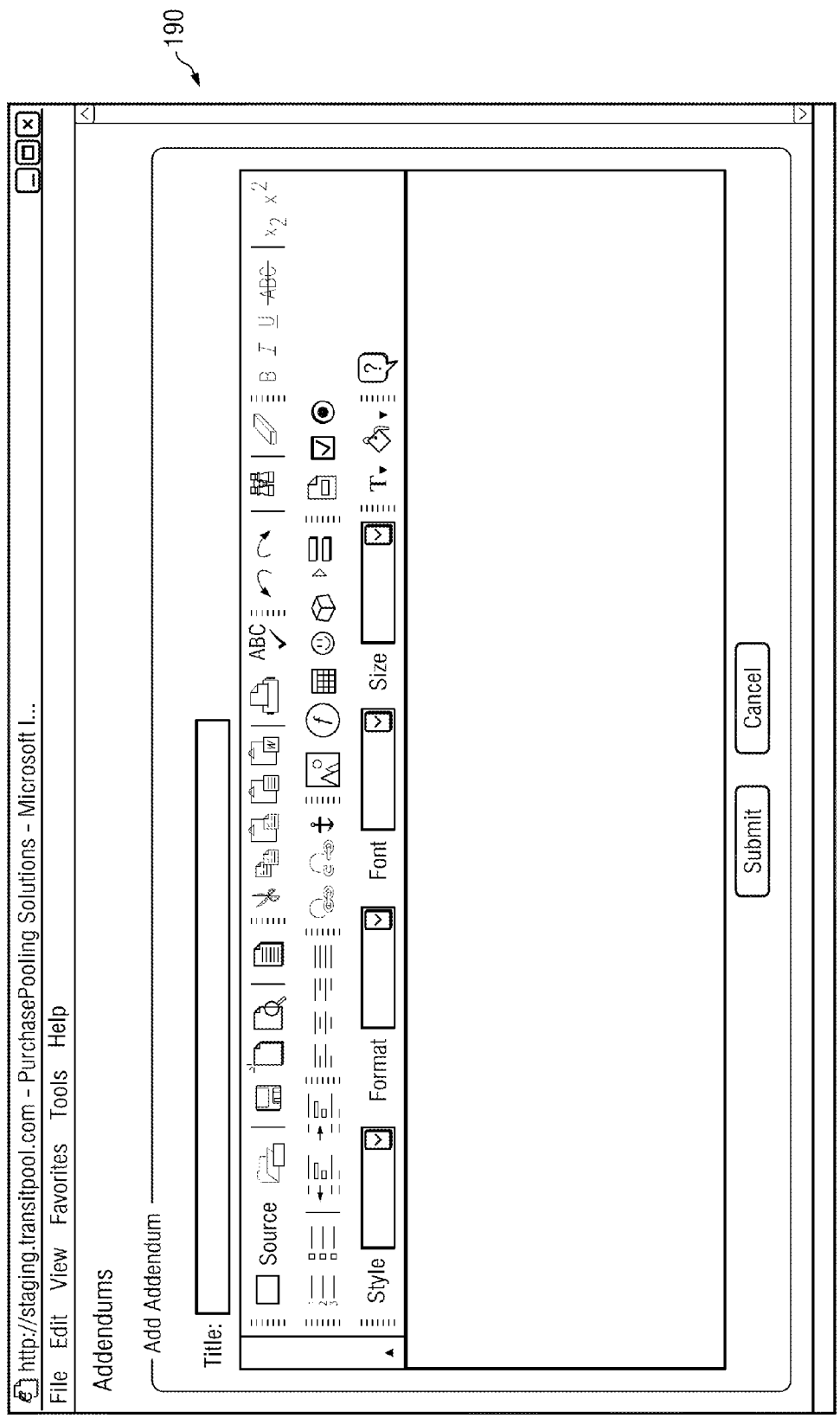
Figure 15:
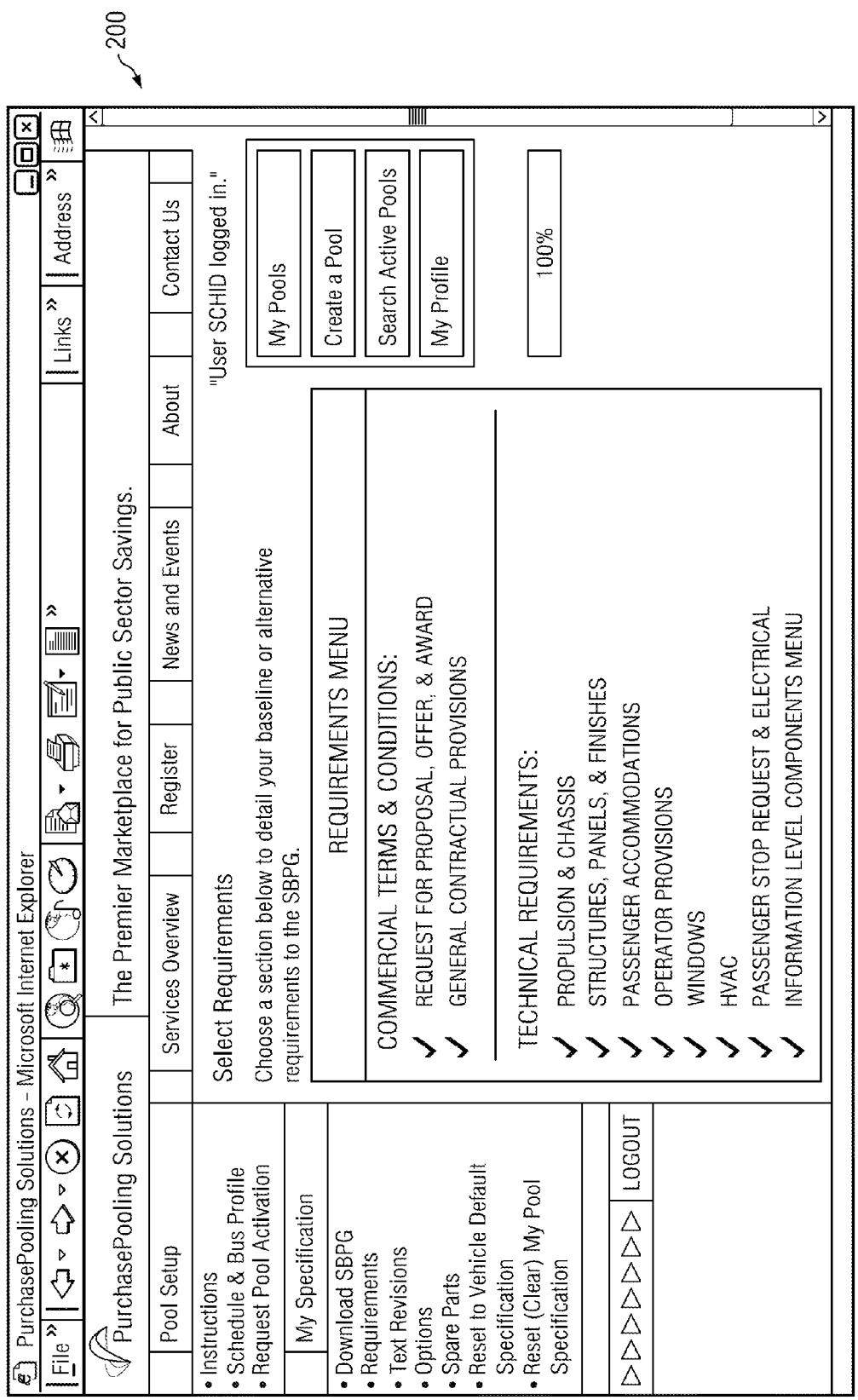
Figure 16:
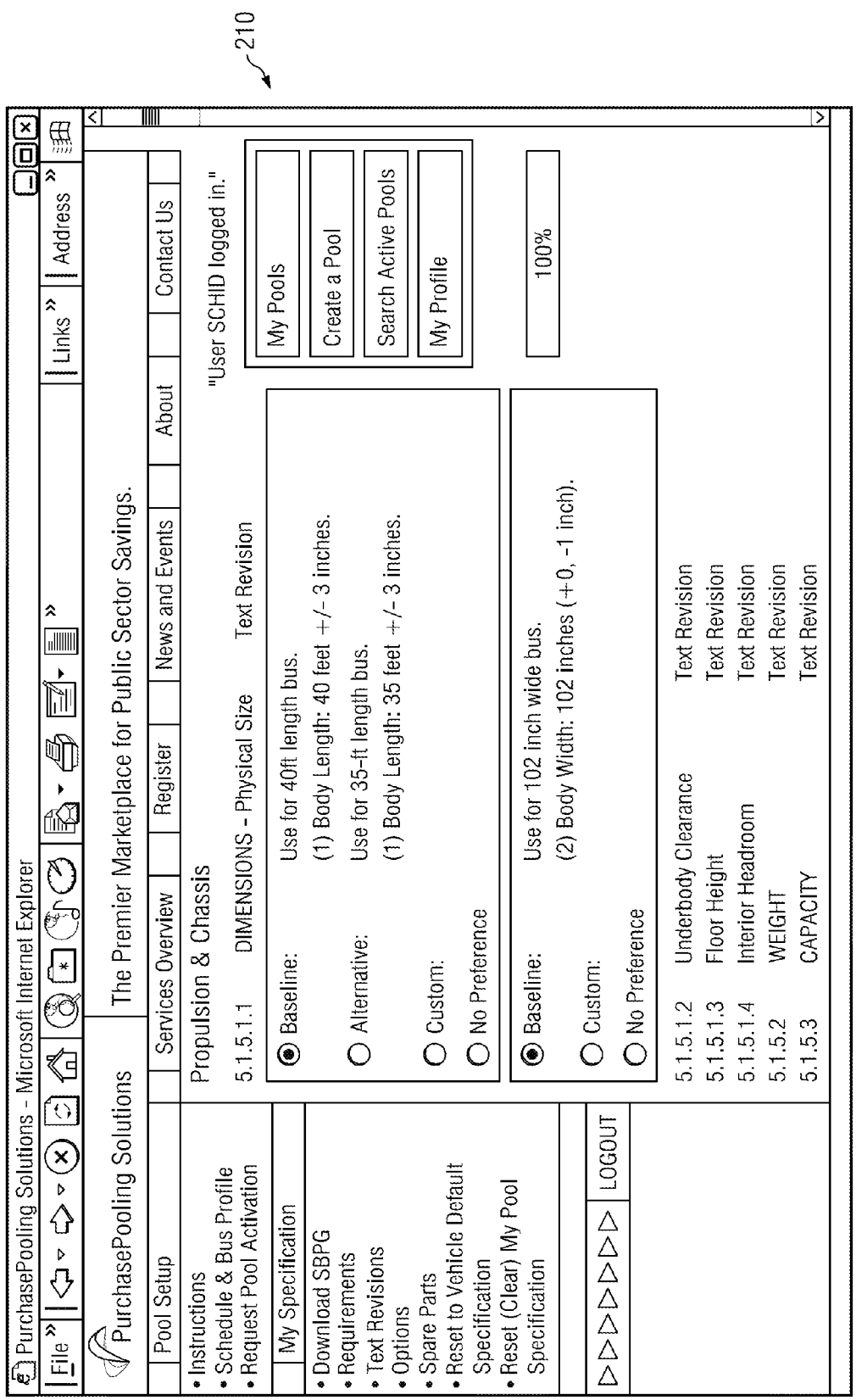
Figure 19:
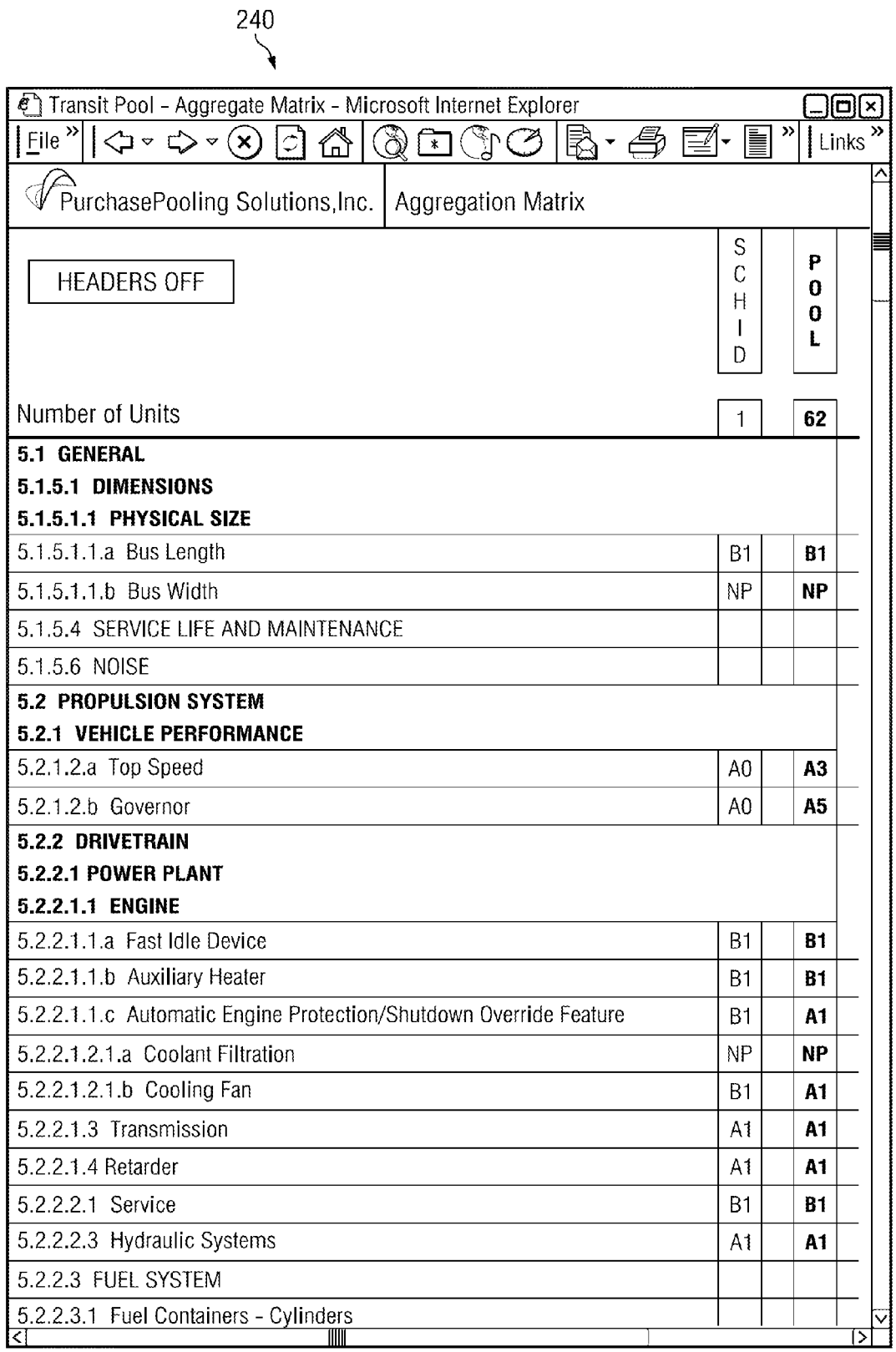

Referring to FIGS. 1-3, flow charts illustrating the acquisition of capital equipment using web-based purchase pooling are shown. At block 10, one or more pools are assembled. Pool assembly includes without limitation creating a new pool and associating one or more users as pool members. This step may include specifying the type associated with the pool member, such as lead agency user, agency user or the like. Pool members may include existing users or newly added users. In one embodiment, new users are solicited to join a newly created pool by email, instant messaging, message board communication, teleconferencing, or by traditional marketing means. A base or default specification may also be created and stored in database 83, as shown in FIG. 4. The base specification may be automatically or manually created.

Pool members may communicate with web-based system 82 over network 88, such as the Internet, using client devices 84a-84n. Client devices 84a-84n may include without limitation desktop computers, laptop computers, servers, palmtop or other hand-held computers, personal digital assistants, Internet enabled mobile phones, Internet appliances and the like.

At block 20, one or more pool members collaborate on an RFP package. Collaboration on an RFP package includes without limitation development of a specification by individual pool members, at block 22. Collaboration may be accomplished between the pool members by any means including without limitation personal contact, email, bulletin board, discussion forum, instant messaging, telephonic and online conferencing communication. For instance, pool members using client devices 84-84n in communication with web-based system 82 over network 88, such as the Internet, may collaborate on an RFP using discussion boards hosted on web-based system 82.

Each pool member may specify deviations and/or variations to the base specification. One or more pool members collaborate for the acquisition of capital equipment and the creation of a joint specification, at block 24. A joint specification includes core features of the capital equipment. In one embodiment, the user preferences, also known as deviations or variations, are assigned a priority and incorporated into the core features based on the priority. The pool member with the largest number of units is given the highest priority with respect to user preferences incorporated as core features. In another embodiment, multiple pool members having the same user preferences for one or more portions of the specification may be grouped together. In effect, group the individual pool members forms a voting group or proxy. If the pool members of this group collectively have the largest number of units then their user preferences are given the highest priority. In yet another embodiment, the priority is base on weighting factors specified by individual pool members for different portions of the specification, at block 26. At block 28, terms and conditions for individual pool members are added to the core specification. In one embodiment, the individual terms and conditions are added as addendums to the core specifications. The core specification provides the advantages of pooled members including volume discounting whereas the terms and conditions provide the pool members with the ability to customize their preferences while still remaining a member of the purchasing pool. After the pool members have collaborated in developing an RFP package, the RFP is published, at block 30.

Vendors may communicate with web-based system 82 over network 88, such as the Internet, using vendor devices 86a-86n. Vendor devices 86a-86n may include without limitation desktop computers, laptop computers, servers, palmtop or other hand-held computers, personal digital assistants, Internet enabled mobile phones, Internet appliances and the like.

The vendor prepares a bid proposal at block 40. As shown at blocks 42-46, the bid proposal preparation includes without limitation creating and editing a discount schedule, creating and editing approved equals, and establishing pricing. The preparation of a bid proposal may also include collaboration with the pool members. At block 50, the vendor bid is submitted to the pool members for their evaluation. At block 60, the bid proposal is evaluated by the pool members. If the pool members agree to the bid proposal, then a contract based on the bid proposal is awarded at block 70. If the pool members do not agree on the bid proposal, then one or more of the above steps may be repeated.

Referring to FIGS. 5-21, an exemplary web-based purchase pooling computer program according to the present invention is shown. According to this example, a pool member may select a pool to participate from a list of purchasing pools, as shown at 100. The list of purchasing pools displayed may be limited to those purchasing pools that the user has been invited to participate as a pool member. As shown at 110, a purchasing pool may include a pool description generally describing the capital equipment to be purchased by members of the purchasing pool. New pool members may be solicited to join a newly created purchasing pool, as shown at 120. During the web-based purchase pooling process, pool members may collaborate by any means including message discussion boards, as shown at 130. Because of the complexity of an RFP that is often required to purchase capital equipment, the technical specification to be used for the RFP may be separated into different sections, as shown in 140 and 200. A pool member may either utilize the fields in the default specification or enter customized user preferences, as shown in 150 and 210. For instance, a portion of a default specification is shown at 160. After completing one or more sections of the technical specification, a user may elect to view a proposed RFP based on the then-completed sections, as shown at 170 and 180. The pool member may also add customized addendums and/or text revisions to a proposed RFP, as shown at 190 and 220. An aggregation matrix may be provided to view customized portions of the proposed RFP, as shown at 230 and 240. The pool member may also compare differences in prices and specifications, as shown at 250 and 260. It is to be understood that the present invention is not limited to the web-based purchase pooling computer program shown in FIGS. 5-21 and that these figures are instead provided as one possible example.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for the acquisition of capital equipment using web-based purchase pooling, wherein the method is implemented by one or more processors executing processor instructions stored on a computer readable medium, the method comprising the processor implemented steps of:
   storing a default specification for capital equipment in a database;
   assigning a plurality of potential buyers to a purchasing pool, at least one or more the potential buyers having an interest in the collective purchase of the capital equipment;
   providing access to the default specification via a web-based system in communication with the database to the plurality of potential buyers using client devices over a network, wherein the default specification is associated with the purchasing pool;
   receiving, by the web-based system, a plurality of customized specifications based on the default specification from one or more of the plurality of potential buyers via the client devices, wherein the plurality of customized specifications are stored in the database;
   determining, by the web-based system, common portions and non-common portions of the plurality of customized specifications based on a comparison of the plurality of customized specifications;
   receiving, by the web-based system, a plurality of weights associated with the non-common portions from one or more of the plurality of potential buyers via the client devices;
   selecting, by the web-based system, at least one of the non-common portions, wherein the non-common portions associated with the highest weights are selected, wherein selecting at least one of the non-common portions comprises prioritizing the non-common portions, and selecting at least one of the non-common portions with the highest priority, and wherein prioritizing the non-common portions is based on the number of capital equipment; and
   providing, by the web-based system, a request for proposal to at least one potential seller of capital equipment, wherein the request for proposal comprises the common portions and the selected non-common portions and a number of capital equipment for each of the plurality of potential buyers, and wherein the request for proposal represents at least two or more of the potential buyers to the purchasing pool.

2. The method of claim 1, wherein the request for proposal further comprises unselected non-common portions.

3. The method of claim 2, wherein the unselected non-common portions are included as addendums to the request for proposal.

4. The method of claim 1, wherein the non-common portions associated with one of the plurality of potential buyers having the largest number are selected.

5. The method of claim 1, wherein the non-common portions associated with two or more of the plurality of potential buyers collectively having the largest number are selected.

6. The method of claim 1, further comprising:
   assigning at least one potential seller to the purchasing pool; and
   providing access to the purchasing pool via the web-based system to the at least one potential seller using a vendor device over a network.

7. The method of claim 6, further comprising receiving, by the web-based system, pricing information from the potential seller based on the request for proposal.

8. The method of claim 7, wherein the request for proposal further comprises unselected non-common portions.

9. The method of claim 8, wherein the pricing information comprises pricing information for each of the common portions and the non-common portions.

10. The method of claim 6, further comprising receiving, by the web-based system, from the potential seller equivalents to one or more of the common portions or the non-common portions.

11. The method of claim 1, wherein selecting at least one of the non-common portions comprises collaboration between the plurality of potential buyers.

12. The method of claim 11, wherein the collaboration comprises electronic communication between the plurality of potential buyers.

13. The method of claim 12, wherein the electronic communication comprises e-mail communication.

14. The method of claim 12, wherein the electronic communication comprises message board communication.

15. The method of claim 11, wherein the collaboration comprises displaying the non-common portions to the plurality of potential buyers.

16. The method of claim 15, wherein displaying the non-common portions comprises displaying the non-common portions as a matrix.

17. The method of claim 15, wherein displaying the non-common portions comprises displaying the non-common portions using a collapsible XML structure.

18. The method of claim 1, wherein the potential buyers comprise governmental agencies.

19. The method of claim 1, further comprising conducting a preliminary survey to determine the plurality of potential buyers to be assigned to the purchasing pool.

20. The method of claim 1, further comprising creating a default specification for capital equipment.

21. The method of claim 20, wherein the default specification is created by at least one of the plurality of potential buyers.

22. The method of claim 20, wherein the default specification is created by a seller of the capital equipment.

23. A non-transitory computer program product stored on a computer readable medium for the acquisition of capital equipment using web-based purchase pooling, the computer program product comprising:
   a first computer code for storing a default specification for capital equipment in a database;

a second computer code for assigning a plurality of potential buyers to a purchasing pool, at least one or more the potential buyers having an interest in the collective purchase of the capital equipment;

a third computer code for providing access to the default specification via a web-based system in communication with the database to the plurality of potential buyers using client devices over a network, wherein the default specification is associated with the purchasing pool;

a fourth computer code for receiving, by the web-based system, a plurality of customized specifications based on the default specification from one or more of the plurality of potential buyers via the client devices, wherein the plurality of customized specifications are stored in the database;

a fifth computer code for determining, by the web-based system, common portions and non-common portions of the plurality of customized specifications based on a comparison of the plurality of customized specifications;

a sixth computer code for receiving, by the web-based system, a plurality of weights associated with the non-common portions from one or more of the plurality of potential buyers via the client devices;

a seventh computer code for receiving, by the web-based system, a selection of at least one of the non-common portions, wherein the non-common portions associated with the highest weights are selected; and an eight computer code for providing, by the web-based system, a request for proposal to at least one potential seller of capital equipment, wherein the request for proposal comprises the common portions and the selected non-common portions, and wherein the request for proposal represents at least two or more of the potential buyers to the purchasing pool.

24. The non-transitory computer program product of claim 23, wherein the seventh computer code for selecting at least one of the non-common portions comprises:
a ninth computer code for prioritizing the non-common portions; and
a tenth computer code for selecting at least one of the non-common portions with the highest priority.

25. The non-transitory computer program product of claim 23, further comprising:
a ninth computer code for assigning to the at least one potential seller to a purchasing pool; and
a tenth computer code for providing access to the purchasing pool via the web-based system to the at least one potential seller using a vendor device over a network.

26. The non-transitory computer program product of claim 25, further comprising an eleventh computer code for receiving, by the web-based system, pricing information based on the request for proposal.

27. A system for the acquisition of capital equipment using web-based purchase pooling, comprising:
a database configured to store a default specification for capital equipment;
a plurality of client devices for use by potential purchasers of capital equipment; and
a web-based system in communication with the database and the plurality of client devices, wherein the web-based system is configured to:
provide access to the default specification via a web-based system to the plurality of potential buyers in a purchasing pool, at least one or more the potential buyers having an interest in the collective purchase of the capital equipment using their respective client devices,
receive a plurality of customized specifications based on the default specification from one or more of the plurality of potential buyers via their respective client devices,
determine common portions and non-common portions of the plurality of customized specifications based on a comparison of the plurality of customized specifications,
receive a plurality of weights associated with the non-common portions from one or more of the plurality of potential buyers via the client devices,
receive a selection of at least one of the non-common portions, wherein the non-common portions associated with the highest weights are selected, and
provide a request for proposal to at least one potential seller of capital equipment, wherein the request for proposal comprises the common portions and at least one of the non-common portions, and wherein the request for proposal represents at least two or more of the potential buyers to the purchasing pool.

28. The system of claim 27, wherein the request for proposal comprises each of the non-common portions.

29. The system of claim 28, further comprising:
a plurality of vendor devices for use by potential sellers of capital equipment, the plurality of vendor devices communicating with the web-based system, wherein the web-based system is further configured to enable the potential sellers to use their respective vendor devices to specify pricing information for the common and non-common portions of the cooperative request for proposal.

30. The system of claim 27, wherein the web-based system is further configured to receive a default specification for capital equipment.

31. The system of claim 30, wherein the default specification is created by at least one of the plurality of potential buyers.

32. The system of claim 30, wherein the default specification is created by a seller of the capital equipment.

33. A method for the acquisition of capital equipment using web-based purchase pooling, wherein the method is implemented by one or more processors executing processor instructions stored on a computer readable medium, the method comprising the processor implemented steps of:
storing a default specification for capital equipment in a database;
assigning a plurality of potential buyers to a purchasing pool;
providing access to the default specification via a web-based system in communication with the database to the plurality of potential buyers using client devices over a network, wherein the default specification is associated with the purchasing pool;
receiving, by the web-based system, a plurality of customized specifications based on the default specification from one or more of the plurality of potential buyers via the client devices, wherein the plurality of customized specifications are stored in the database;
determining, by the web-based system, common portions and non-common portions of the plurality of customized specifications based on a comparison of the plurality of customized specifications;

receiving, by the web-based system, a plurality of weights associated with the non-common portions from one or more of the plurality of potential buyers via the client devices;

selecting, by the web-based system, at least one of the non-common portions, wherein selecting at least one of the non-common portions comprises prioritizing the non-common portions, and selecting at least one of the non-common portions associated with the highest weights are selected and with the highest priority;

providing, by the web-based system, a request for proposal to at least one potential seller of capital equipment, wherein the request for proposal comprises the common portions and the selected non-common portions, wherein the request for proposal further comprises a number of capital equipment for each of the plurality of potential buyers, and wherein prioritizing the non-common portions is based on the number of capital equipment.

* * * * *